Dec. 4, 1928.                                            1,694,071
H. C. MALLORY
COOLING SYSTEM FOR AIRCRAFT ENGINES
Filed Jan. 6, 1922
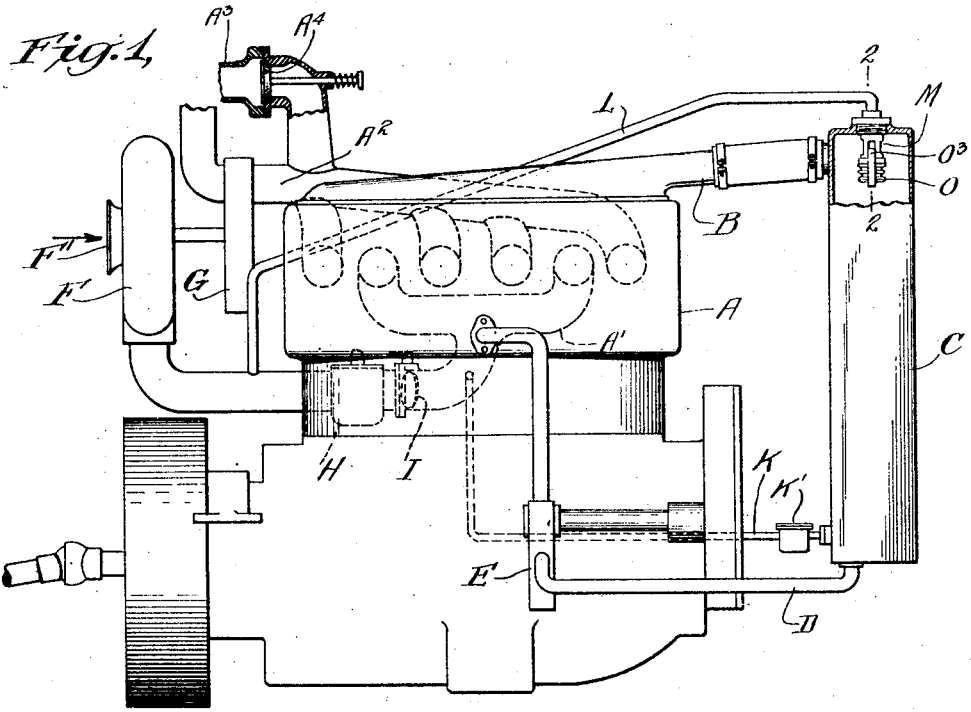
INVENTOR
HARRY C. MALLORY
BY John E. Hubbell
ATTORNEY Patented Dec. 4, 1928.

1,694,071

UNITED STATES PATENT OFFICE.

HARRY C. MALLORY, OF NEW YORK, N. Y.; SUE R. MALLORY ADMINISTRATRIX OF SAID HARRY C. MALLORY, DECEASED.

COOLING SYSTEM FOR AIRCRAFT ENGINES.

Application filed January 6, 1922. Serial No. 527,503.

The general object of my present invention is to provide an improved cooling system for an internal combustion engine. More specifically the object of my invention is to provide a cooling system especially adapted for use with an engine employed to drive aircraft and comprising provisions for making the operation of the cooling system independent of the varying pressure of the atmosphere as the altitude of the aeroplane varies.

In carrying out my invention I employ an engine cooling system of the type in which a cooling liquid is vaporized by the heat in the engine cooling space, and the vapor thus generated is condensed in a suitable condenser from which liquid of condensation is returned to the engine cooling space, and my invention comprises novel means for varying the capacity of the condenser by varying the amount of air therein as required to maintain a pressure in the vapor portion of the cooling system which is approximately constant and is the pressure of saturated vapor of the cooling liquid at the temperature which it is desired to maintain in the engine cooling space.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described preferred embodiments of my invention.

Of the drawings:

Fig. 1 is a diagrammatic representation of an aeroplane engine cooling system;

Fig. 2 is a sectional elevation of a control valve employed in the apparatus shown in Fig. 1, the section being taken on the line 2—2 of Fig. 1; and Fig. 3 is a sectional elevation of a modified form of control valve which may be employed in lieu of that shown in Fig. 2.

In the drawings and referring first to the construction shown in Figs. 1 and 2, A represents an aeroplane engine having an outlet connection B for cooling fluid leading from the engine cooling jacket or space to the top of the condenser C. D represents a return pipe through which water of condensation is passed by the pump E, from the bottom of the condenser back into the engine cooling space. The engine A is provided with a supercharger for supplying charge forming air to the engine cylinders at a pressure above that of the atmosphere particularly when the aircraft is at high altitudes. The supercharger in the form shown is of the type disclosed by the patent to Rateau No. 1,375,931 and comprises a compressor F and a turbine G for driving the compressor. The turbine is driven by the exhaust gases passed to the turbine from the engine cylinders through the engine exhaust connection $A^2$, and the compressor F takes air from the atmosphere through its inlet $F'$, and after compressing the air, delivers it to the intake manifold $A'$ of the engine.

To permit of a regulation of the operation of the supercharger an outlet $A^3$ is provided through which the exhaust gases from the engine cylinders may pass directly to the atmosphere without passing through the turbine G. A valve $A^4$ forms a means for opening, closing or throttling the outlet $A^3$ according to the desired condition of operation. With the supercharger out of operation a separate inlet to the suction intake manifold $A'$ of the engine may be opened if the type of compressor F employed makes this necessary. Ordinarily such an inlet is not required, however, as the type of compressor usually employed permits air to be drawn through it, when standing idle, without an appreciable drop in the pressure of the air. H represents the carburetor and I the throttle valve located in the connection between the outlet of the compressor F and the suction intake manifold $A'$.

Air is withdrawn from the condenser C continuously while the engine is in operation by means of a suitable air exhausting connection. As shown the air exhausting effect is obtained by means of a pipe K connecting the lower portion of the condenser to the intake manifold $A'$. The pipe K may advantageously include an air valve $K'$ restricting the escape of vapor through the pipe K. Air is supplied to the condenser C as required to maintain a definite pressure in the vapor space of the condenser by an automatic pressure regulating valve M. As shown in Figs. 1 an 2, the valve M comprises a casing element $M^5$ threaded into the wall of the condenser casing and provided with a valve seated port M' connected by a pipe L to the outlet of the compressor F at the supply side of the carburetor H and throttle valve I. Flow of air through the pipe L into the condenser casing through the port M' is controlled by a valve member M² in automatic response to the pressure within the condenser. As shown the stem of the valve member M² is connected for this purpose by a yoke O³ to the floating end or head O² of a bellows or expansible container O, the opposite end of which is stationary. As shown the bellows member is of cup form and is closed at its mouth by the cup-shaped end member O' which with the end of the bellows proper is expanded into the internally grooved collar P. The bellows O is supported by a threaded connection between the collar P and a tubular extension M³ of the casing element M⁵. Ports are formed through the tubular port M³ to put the interior of the latter in free communication with the condenser interior, and to provide for the movement of the yoke O³ which extends about the bellows O and collar P. A spring Q acting between the casing element M⁵ and a nut or cross head M⁴ adjustably secured on the stem of the valve member M² tends to hold the valve open. The interior of the bellows element O is exhausted to provide a more or less perfect vacuum therein.

With the described arrangement the pressure within the condenser tends to collapse the bellows O and move the valve M² against its seat, while the spring Q tends to expand the bellows and move the valve M² off its seat. In practice the tension of the spring Q is adjusted so that with the desired pressure within the condenser, the force tending to open the valve exerted by the spring Q against the yoke O³ will balance the valve closing force transmitted to the yoke from the movable end O² of the bellows O. With the apparatus thus adjusted, when the pressure in the condenser falls below the desired pressure, the valve M² will move off its seat and admit air to the condenser through the port M', while when the pressure in the condenser rises above the desired pressure the valve M² will be seated and close the port M'.

In practical operation the apparatus should be so designed and proportioned that the continued withdrawal of air from the condenser through the pipe K tends to reduce the pressure in the condenser to a value less than that which it is desired to maintain. In consequence the valve M will normally be "cracked", and permit a continued influx of air as required to maintain the pressure in the condenser at the desired value. The capacity of the condenser to condense vapor, other conditions being constant, depends upon the amount of air in the condenser as air present in the condenser reduces the condenser capacity in much the same way as would an actual elimination of a portion of the condensing surface.

The pressure in the vapor space of the cooling system is a measure of the temperature in the engine cooling space since it determines the temperature at which the cooling liquid boils. As the engine load increases, and the quantity of heat absorbed by the cooling liquid increases, or as the external atmospheric conditions change to decrease the cooling effect exerted on the condenser, the pressure of the vapor in the condenser tends to increase with a corresponding increase in temperature in the engine cooling space. With the present invention, when this rise in pressure in the condenser occurs, the first effect is to tightly close the port M' after which the continued withdrawal of air through the pipe K quickly increases the capacity of the condenser as required to condense the vapor formed at the pressure which it is desired to maintain in the condenser. Conversely, when a decreased rate of vapor generation, or an increased condenser cooling effect occurs, the tendency is to lower the vapor pressure in the condenser and thereby to lower the temperature in the engine cooling space, and this is counteracted by the action of the valve M in opening the port M' and permitting air to enter the condenser and reduce its capacity so that the desired pressure and temperature within the system is restored. In practice the pressure which it is desired to maintain in the condenser will ordinarily be appreciably below the normal atmospheric pressure at sea level but will be above the pressure of the atmosphere at altitudes frequently reached with aeroplanes.

By connecting the inlet of the valve M to the delivery side of the compressor F it is possible to maintain a pressure in the condenser above that of the atmosphere when the engine is at an altitude at which the pressure of the atmosphere is less than the pressure of vapor of the cooling liquid corresponding to the temperature which it is desired to maintain in the engine cooling space. By means of the present invention it is possible therefore to make the temperature in the engine cooling space independent of the fluctuations in temperature and the pressure of the atmosphere through which the aeroplane moves. It is possible, of course, to design a valve mechanism which will act in response to the pressure fluctuations within the condenser as does the valve mechanism M without placing the valve mechanism within the condenser as shown, but the location of this valve mechanism within the condenser avoids any trouble which might otherwise occur from exposing the valve mechanism to temperatures below the freezing point of water.

Since the vapor pressure in the cooling system fixes the boiling point of the cooling liquid, a regulation of the condenser capacity in direct response to the vapor pressure in the system is a regulation in indirect response to the temperature in the engine cooling space.

In lieu of regulating the accumulation of air in the condenser in direct response to the vapor pressure in the system, the accumulation of air may be regulated in direct response to the temperature in the engine cooling space and in Fig. 3 I have shown a valve mechanism MA for this purpose. The valve mechanism MA which may regulate the influx of air into the condenser through the pipe L is operated thermostatically. The valve mechanism MA comprises a casing element $M^{50}$ generally like the element $M^5$ above described, and formed with a valve seated port $M^{10}$ communicating with the pipe. The thermostatic element of the valve mechanism MA, as shown, is a bellows OA which must be located in some high temperature portion of the engine cooling system and is advantageously located, as shown, in the outlet connection B from the engine cooling space to the condenser C. The bellows member OA may be formed generally like the bellows O first described, and has its collar PA secured to the tubular portions $M^{30}$ of the valve casing element $M^{50}$ by a threaded connection, but in the valve mechanism MA the free or movable end $O^{20}$ of the bellows OA is the end adjacent the port $M^{10}$ and carries the valve member $M^{20}$ controlling that port. The thermostatic bellows OA may be charged with a suitable fluid thermal agent of the usual character.

The thermostatic valve actuating mechanism is calibrated or adjusted so that when the temperature to which it is subjected rises above that which it is desired to maintain in the engine cooling space, the bellows will expand and close the port $M^{10}$, and when the temperature to which the thermostatic mechanism is subjected falls below that which it is desired to maintain in the engine cooling space the bellows will contract and open the port $M^{10}$. The thermostatic valve actuating mechanism of Fig. 3 thus increases and decreases the condenser capacity in response to changing conditions exactly as does valve mechanism M of Figs. 1 and 2.

Various novel features of construction and arrangement disclosed and not claimed herein are claimed in my co-pending applications, Serial No. 163,332, filed April 20, 1917, and Serial No. 473,439, filed May 28, 1921.

While in accordance with the provisions of the statutes I have illustrated and described the best form of my present invention now known to me, it will be apparent to those skilled in the art that changes may be made in the form of my invention without departing from the spirit of my invention as set forth in the appended claims, and that certain features of my invention may sometimes be used to advantage without a corresponding use of other features.

Having now described my invention, what I claim as new and desire to secure by Letters Patent, is:

1. The combination with an internal combustion engine and a supercharger for supplying air to the engine cylinders at a pressure above that of the surrounding atmosphere, of an engine cooling system comprising a condenser connected to the engine cooling space for condensing vapor generated by heat absorbed by a cooling liquid in said space, and means for regulating the capacity of the condenser including provisions for supplying air from the supercharger to the cooling system at a pressure above that of the surrounding atmosphere.

2. The combination with an internal combustion engine and a supercharger for supplying air to the engine cylinders at a pressure above that of the surrounding atmosphere, of an engine cooling system comprising a condenser connected to the engine cooling space for condensing vapor generated by heat absorbed by a cooling liquid in said space, and means for regulating the capacity of the condenser in automatic response to the temperature in the engine cooling space including provisions for supplying air to the system from the supercharger at a pressure above that of the surrounding atmosphere.

3. The combination with an internal combustion engine and a supercharger for supplying air to the engine cylinders at a pressure above that of the surrounding atmosphere, of an engine cooling system comprising a condenser connected to the engine cooling space for condensing vapor generated by heat absorbed by a cooling liquid in said space, and means for regulating the capacity of the condenser including a control device automatically responsive to the absolute pressure in the vapor space of the cooling system for supplying air to the latter from the supercharger as required to prevent the absolute pressure in said system from falling below a predetermined value.

4. The combination with an internal combustion engine and a supercharger for supplying air to the engine cylinders at a pressure above that of the surrounding atmosphere, of an engine cooling system comprising a condenser connected to the engine cooling space for condensing vapor generated by heat absorbed by a cooling liquid in said space, and means for regulating the capacity of the condenser including provisions for exhausting air from the cooling system, and provisions for supplying air from the supercharger to the cooling system at a pressure above that of the surrounding atmosphere.

5. In an internal combustion engine cooling system comprising a condenser connected to the engine cooling space for condensing vapor generated by heat absorbed by a cooling liquid in said space, the improvement which consists in means for regulating the capacity of the condenser including a control device in the form of an exhausted expansible container subjected externally to the pressure within the cooling system, and resilient means opposing the tendency of said absolute pressure to collapse said container.

6. In an internal combustion engine cooling system of the boiling and condensing type, the combination with a condenser connected to the engine cooling space for condensing vapor generated by heat absorbed by a cooling liquid in said space, of means for varying the condensing capacity of the condenser, and means automatically responsive to the absolute pressure in the cooling system for actuating the first mentioned means as required to maintain said pressure approximately constant.

Signed at New York city, in the county of New York and State of New York, this 5th day of January, A. D. 1922.

H. C. MALLORY.